United States Patent
Muramatsu

Patent Number: 6,139,121
Date of Patent: *Oct. 31, 2000

[54] POSITIVE DRIVE RUBBER TRACK

[75] Inventor: Tateo Muramatsu, Yokohama, Japan

[73] Assignee: Bridgestone/Firestone, Inc., Akron, Ohio

[*] Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 475 days.

[21] Appl. No.: 08/521,626

[22] Filed: Aug. 31, 1995

Related U.S. Application Data

[63] Continuation-in-part of application No. 08/435,433, May 10, 1995, abandoned.

[51] Int. Cl.[7] .................................................. B62D 55/24
[52] U.S. Cl. ........................................... 305/173; 305/195
[58] Field of Search ............................. 305/53, 169, 173, 305/174, 193, 195, 199

[56] References Cited

U.S. PATENT DOCUMENTS

| | | | |
|---|---|---|---|
| 3,567,294 | 3/1971 | Simpson et al. | 305/57 |
| 4,241,956 | 12/1980 | Meisel, Jr. | 305/35 EB |
| 4,278,301 | 7/1981 | Gregor et al. | 305/11 |
| 4,425,007 | 1/1984 | Soeteber | 305/11 |
| 5,295,741 | 3/1994 | Togashi et al. | 305/38 |
| 5,352,029 | 10/1994 | Nagorcka | 305/39 |
| 5,447,365 | 9/1995 | Muramatsu et al. | 305/38 |

FOREIGN PATENT DOCUMENTS

WO 93/11022  6/1993  WIPO.

*Primary Examiner*—D. Glenn Dayoan
*Attorney, Agent, or Firm*—Jones, Day, Reavis & Pogue

[57] ABSTRACT

A positive drive endless rubber track system for the undercarriage of a vehicle, the rubber track including spaced guide lugs projecting inwardly therefrom, the undercarriage including a drive wheel having spaced sprocket pins thereon, idler wheels, and tension adapting wheels around which the endless rubber track is guided and driven by the driving wheel, the drive wheel being attached to the vehicle and having an up-ratio in the range of about 0.5% to about 4.0%.

22 Claims, 4 Drawing Sheets

UNDER SIZED SPROCKET
(NOT ACCEPTABLE)

DRIVING DIRECTION →

GOOD UP RATIO
(ACCEPTABLE)

DRIVING DIRECTION →

SLIGHTLY LARGE UP RATIO
(ACCEPTABLE)

DRIVING DIRECTION →

POSITIVE DRIVE RUBBER TRACK

This is a continuation-in-part of application Ser. No. 08/435,433 filed May 10, 1995 and now abandoned.

BACKGROUND OF THE INVENTION

1. Field of the Invention

The present invention relates in general to endless belt crawler type vehicles and in particular to a positive drive rubber track for such vehicle that has a sprocket up-ratio that provides correct engagement between the sprocket pins on the drive wheel and the regularly spaced guide lugs on the rubber track.

2. Description of Related Art

Rubber track has become popular due to an increase in construction in urban areas where vehicles having tracks must drive on the pavement and because there is a demand for low soil compaction farming. With the combination of rubber technology and a tremendous amount of trial and error, various types of rubber tracks are now available in the industry. They are used on excavators, dump carriers, boring machines, combines, tractors, and the like. Most of them operate on the job site only and are transported between sites by trucks or trailers. To eliminate the inconvenience of transporting the vehicle between job sites, a vehicle which can operate both on public roads at normal speeds and in off-road construction environments is required. However, such a vehicle will have to be constructed so as to provide little damage to the pavement, include less vibration and noise, and operate with less maintenance and lubrication.

At present, friction drive tracks, without metal embeds, have been developed for use in the agricultural industry and also for use in high speed applications. Such, friction drive systems require relatively high belt tension to maintain sufficient friction between the track and the drive sprocket to prevent slippage.

The rubber track vehicle can provide the needed advantages if a system can be developed in which a positive drive provides a means to transmit torque to the track with relatively low tension under adverse conditions and in which the engagement between the drive sprocket and the track guide achieves acceptable track life and reduces driving power loss. The rubber track includes an endless belt-shaped, rubber-like elastic member. As such, vibrations to be transmitted to the vehicle and its occupants are minimized and paved roads are not damaged.

As stated in U.S. Pat. No. 5,295,741, when a vehicle equipped with rubber tracks moves on sandy terrain or quarries, the rubber tracks are likely to shift from advancing directions of the vehicle due to elongations and contractions of the rubber-like material in vertical and horizontal and other directions. As a result, the rubber tracks unavoidably get off sprocket wheels or track rollers of the vehicle. Various attempts have been made in order to prevent the dislodgement of the rubber tracks from the vehicle, but they have not met with success.

SUMMARY OF THE INVENTION

It has been found that for a successful positive drive rubber track, the correct engagement between the sprocket pins on the drive wheel and the guide lugs protruding from the rubber track is necessary. Such engagement is defined as the "up-ratio" of the sprocket or drive wheel. With a positive drive rubber track, compared to a friction system, much firmer torque transfer can be provided without slippage. Further, with the proper up-ratio, gouging between the pin and the lug does not exist. Therefore, with the present invention there is a longer life of the rubber track because there is no gouging and there is less power loss with less fuel usage.

The drive wheel up-ratio, Ur, is defined as:

$$Ur=[(Ps/Pc)-1]\times 100(\%) \tag{1}$$

where the Ps is the pitch or spacing between the sprocket pins on the drive wheel and Pc is the spacing of the guide lugs protruding inwardly from the rubber track and engaged by the sprocket pins. With the present invention, depending on the design criteria of the sprocket, proper up-ratio of the sprocket wheel or drive wheel is in the range of 0.5% to 4.0%.

Thus it is an object of the present invention to provide a positive drive endless rubber track system in which the drive wheel of the system has an up-ratio such that preferably an engaging sprocket pin enters between adjacent guide lugs without contacting either the driving wall or the braking wall of the guide lug then subsequently moves toward and engages the driving wall to drive the adjacent guide lug and then disengages as the drive wheel rotates.

It is still another object of the present invention to provide the correct engagement of the sprocket pins with the guide lugs to enable the successful operation of a positive drive endless rubber track system.

Thus, the present invention relates to a positive drive endless rubber track system for the undercarriage of a vehicle, the undercarriage including a drive wheel, idler wheels, and tension wheels around which the endless rubber track is guided, the system including said drive wheel being attached to the vehicle and having sprocket pins around a circumference thereof that are spaced from each other a distance, Ps, which is defined as $\pi(D+2h)/n$ where D=outside diameter of the sprocket,
n=number of teeth, and
h=winding thickness, regularly spaced guide lugs protruding inwardly from said rubber track and being spaced from each other a distance, Pc, each guide lug having a driving wall and a braking wall, the rubber track engaging the drive wheel such that, during rotation of the drive wheel, each of the drive wheel sprocket pins successively enters between successive adjacent ones of said rubber track guide lugs to engage the driving wall of one of said guide lugs to drive the rubber track, and the drive wheel having an up-ratio of $[(Ps/Pc)-1]\times 100(\%)$ such that preferably an engaging sprocket pin enters between adjacent guide lugs without contacting either the driving wall or the braking wall then subsequently moves toward and engages the driving wall to drive the guide lug and then disengages as the drive wheel continues rotation.

BRIEF DESCRIPTION OF THE DRAWINGS

These and other features of the present invention will be more fully disclosed when taken in conjunction with the following DETAILED DESCRIPTION OF THE PRESENT INVENTION in which like numerals represent like elements and in which.

DETAILED DESCRIPTION OF THE PRESENT INVENTION

Figure 1A:
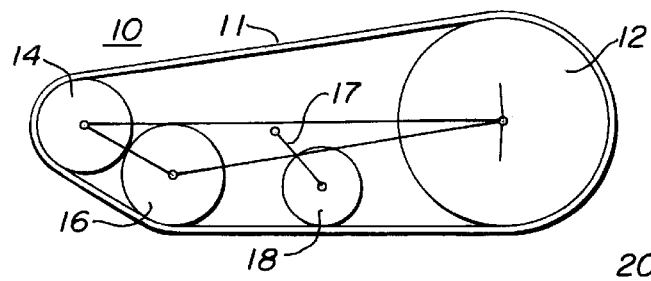
FIGS. 1A and 1B are schematic representations of the undercarriage layout of a positive drive endless rubber track system including a rigid track frame or a swing-arm track frame.
Figure 1B:
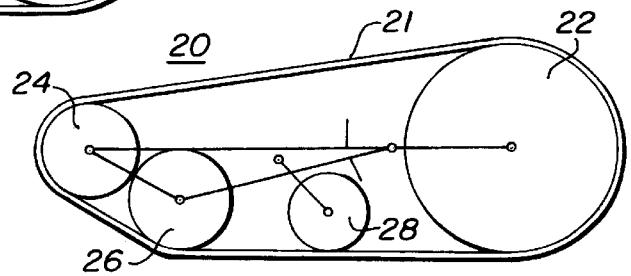

FIG. 1A is a schematic representation of the typical undercarriage of a vehicle that can utilize the positive drive endless rubber track system of the present invention. FIG. 1A illustrates a rigid track frame 10 comprising the sprocket wheel or drive wheel 12, idler wheels 14 and 16, and an adjustable belt tension wheel 18 all of which are encompassed by and in contact with the endless rubber track or drive belt 11. The belt tension wheel 18 may be adjusted as well known with mechanical springs 17 or with hydraulic actuators that are user controlled and may be represented by the numeral 17. Such overall units, as shown, are well known in the art. In like manner, FIG. 1B illustrates a swing-arm-type subcarriage assembly 20 again having a sprocket wheel or drive wheel 22 and idler wheels 24 and 26 and tension adjustment wheel 28 encompassed by and in engagement with an endless rubber track 21 that is driven by wheel 22. The swing-arm track frame of this system is also well known in the art.

Figure 2A:
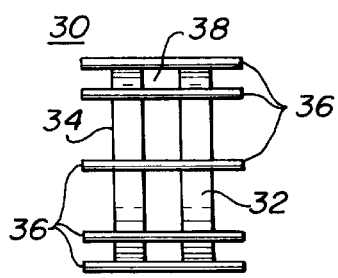
FIGS. 2A and FIG. 2B are front and side views, respectively, of a sprocket wheel in which the sprocket pins are attached to the outer circumference thereof.
Figure 2C:
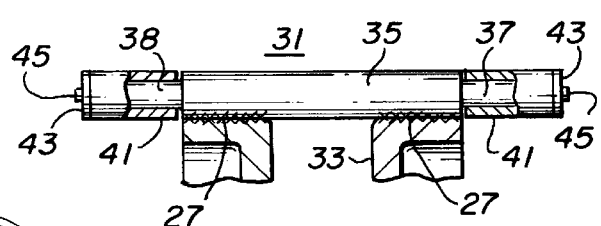
FIG. 2C is an alternate embodiment showing rotatable sleeves on the outer end of each drive pin to reduce friction.
Figure 2B:
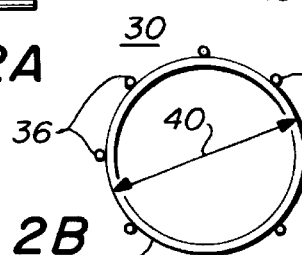

FIGS. 2A and 2B represent the front view and the side view of a sprocket wheel 30 that can be used with the present invention. It includes first and second spaced annular rings 32 and 34 having elongated cylindrical sprocket pins 36 attached to the smooth outer circumference of the first and second spaced angular rings 32 and 34 in spaced relationship to each other to drive the guide lugs on the rubber track, as will be seen in FIGS. 4 and 5 hereafter. The guide lugs on the rubber track 11 or 21 enter into the space 38 between the first and second spaced angular rings 32 and 34 and between adjacent sprocket pins 36. The outside diameter 40 of the drive wheel 30 as shown in FIG. 2B is used to calculate the up-ratio of the sprocket wheel 30 as will be shown hereafter.

FIG. 2C illustrates an alternate embodiment of the drive sprocket 31 including a sprocket wheel 33 having a cylindrical pin with a smooth outer surface 35 attached to wheel 33 as by welding at 27. Drive pins 37 and 38 extend from the sides as shown. A rotatable sleeve 41 is placed over each drive pin 37 and 38 and held in place by any well-known means such as plate 43 which is attached to pin 29 by bolts 45. The rotatable sleeve 41 reduces the friction of the drive pins 37 and 38 as they contact the rubber drive belt which has two parallel rows of drive lugs, not shown but well known in the art.

Figure 3A:
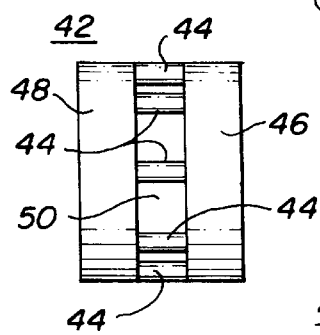
FIG. 3A and FIG. 3B are front and side views, respectively, of a sprocket wheel in which each sprocket pin has its outer surface coterminous with the outer circumference of the sprocket wheel.
Figure 3C:
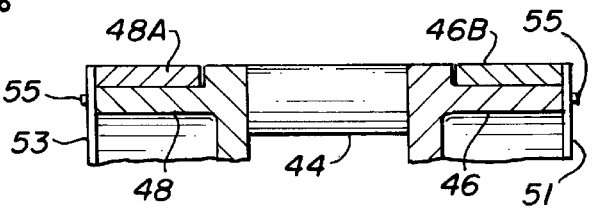
FIG. 3C is an alternate embodiment of a drive wheel having slip rings on the outer surface of the drive wheel to decrease friction.
Figure 3B:
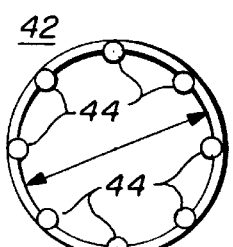
Figure 3D:
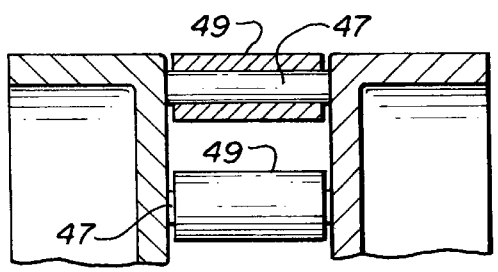
FIG. 3D is still another alternate embodiment illustrating a rotatable sleeve surrounding the drive pin to decrease friction.

Another embodiment using a rotatable sleeve is the embodiment shown in FIG. 3D where a center drive sprocket as shown in FIGS. 3A and 3B has a drive pin 47 surrounded by a rotatable sleeve 49. In each of these embodiments, excellent results were achieved but the rotatable sleeves experienced a high degree of wear.

FIGS. 3A and 3B are front and side views, respectively, of the preferred sprocket wheel 42 that is similar to the sprocket wheel in FIGS. 2A and 2B except that the elongated cylindrical sprocket pins 44 are attached to the angular rings 46 and 48 such that the outer surface of each pin 44 is coterminous with the smooth outer surface circumference of the spaced annular rings 46 and 48. Again, there is a space 50 between the angular rings 46 and 48 into which the guide lugs of the endless rubber track project, as will be shown hereafter.

FIG. 3C is another embodiment of FIG. 3A and FIG. 3B in which a recess is formed in the smooth outer surface circumference of each of the annular rings 46 and 48 in which respective recess slip rings 46A and 48A are placed. The slip rings 46A and 48A reduce the friction contact with the drive belt. Plates 51 and 53 are attached to annular rings 46 and 48, respectively, with any well-known fastening means such as bolts 55 that hold the slip rings 46A and 48A in place on the annular rings 46 and 48.

Figure 4:
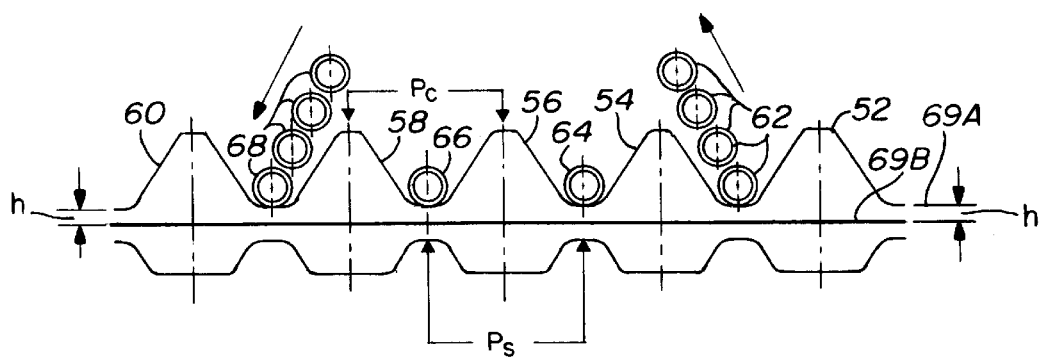
FIG. 4 illustrates a side view of a portion of an endless rubber track illustrating the guide lugs and the sprocket pins in engagement therewith.

FIG. 4 illustrates a simplified model of the engagement between the guide lugs 52, 54, 56, 58, and 60 and the drive pins 62, 64, 66, and 68. The drive or sprocket pins 62–68 travel into and out of the space between the adjacent ones of the rubber track guide lugs following a path in the form of a cycloid curve to move against and drive the track guide lugs 52–60. The up-ratio of the sprocket wheel or drive wheel 30 or 42 shown in FIGS. 2 and 3, respectively, is defined as $[(Ps/Pc)-1] \times 100(\%)$ where Ps represents sprocket pitch or distance between adjacent sprocket pins and Pc represents the rubber track guide lug pitch or the separation or distance between adjacent lugs such as 56 and 58 as shown in FIG. 4. The practical up-ratio, Ur, can be calculated as $$Ur = [(ASPd/CSPd) - 1] \times 100(\%) \qquad (2)$$

where $$CSPd = (Pc \times Pn/\pi) - 2h, \qquad (3)$$

where

ASPd = the actual sprocket wheel diameter,
CSPd = the calculated sprocket wheel diameter,
Pc = spacing distance of guide lugs or guide lug pitch, Pn=the total number of sprocket pins, and h=the winding thickness of the rubber track between the inner surface 67A and the steel reinforcement cord 69B as shown in FIG. 4.

Thus, as shown in FIG. 4, the sprocket pin 62 is shown in several consecutive positions following the cycloidal path out of the space between the two guide lugs 52 and 54 while sprocket pin 68 is shown in several consecutive positions illustrating the path followed by the sprocket pins into the space such as between guide lugs 58 and 60. Sprocket pins 64 and 66 are shown in contact with the rubber track in the area between guide lug pair 54 and 56 and pair 56 and 58. The arrows associated with sprocket pins 62 and 68 illustrate the cycloid curve representing the travel path of the sprocket pins into and out of the space between adjacent guide lugs. The surface 69A is the inner surface of the track 11 (in FIG. 1) that rests on the smooth outer surfaces 46 and 48 of sprocket wheel 42 in FIGS. 3A and 3B. The steel reinforcement cords are designated by the numeral 69B.

The friction drive force, Ff, can be described as:

$$Ff = c(T+w) \quad (4)$$

where c=friction coefficient;

T=track tension; and w=local weight as measured under the sprocket wheel.

The positive drive force, Fp, can be described as:

$$Fp = \Sigma kXn - \Sigma kYn \quad (5)$$

where

Xn=the deflection of the drive side wall of the lug;

Yn=the deflection of the brake side wall of the lug; and k=the spring coefficient of the respective lug walls.

Figure 6A:
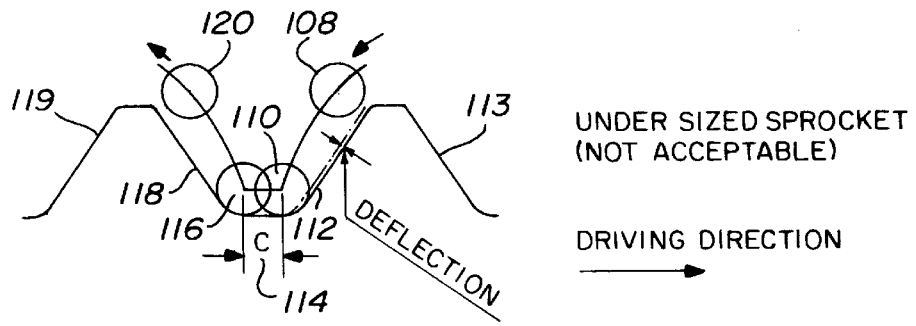
FIGS. 6A, B, and C illustrate the engagement of a sprocket pin with guide lugs on the rubber track for an up-ratio that is too small, that is acceptable, and that is slightly large.
Figure 6B:
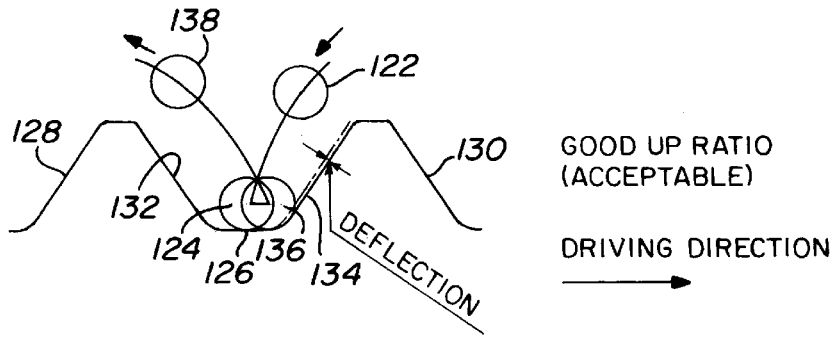
Figure 6C:
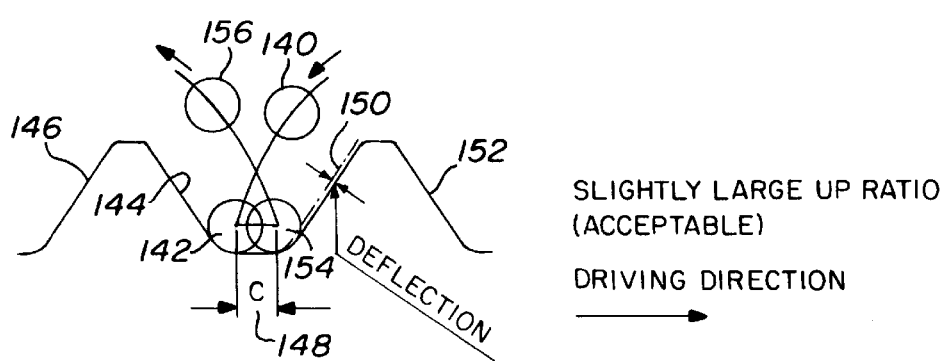

With these relationships, it can be seen that when the driving force, Fd=Ff+Fp, the situation occurring as shown in FIG. 6B, there is good engagement of the sprocket pin with the drive lug and track and minor friction occurs. When Fd=Ff−Fp, the situation occurring as shown in FIG. 6C, there is substantial friction and the positive force is braking. When Fd=Fp−Ff, the situation occurring in FIG. 6A, the friction force, itself, is braking.

Figure 5:
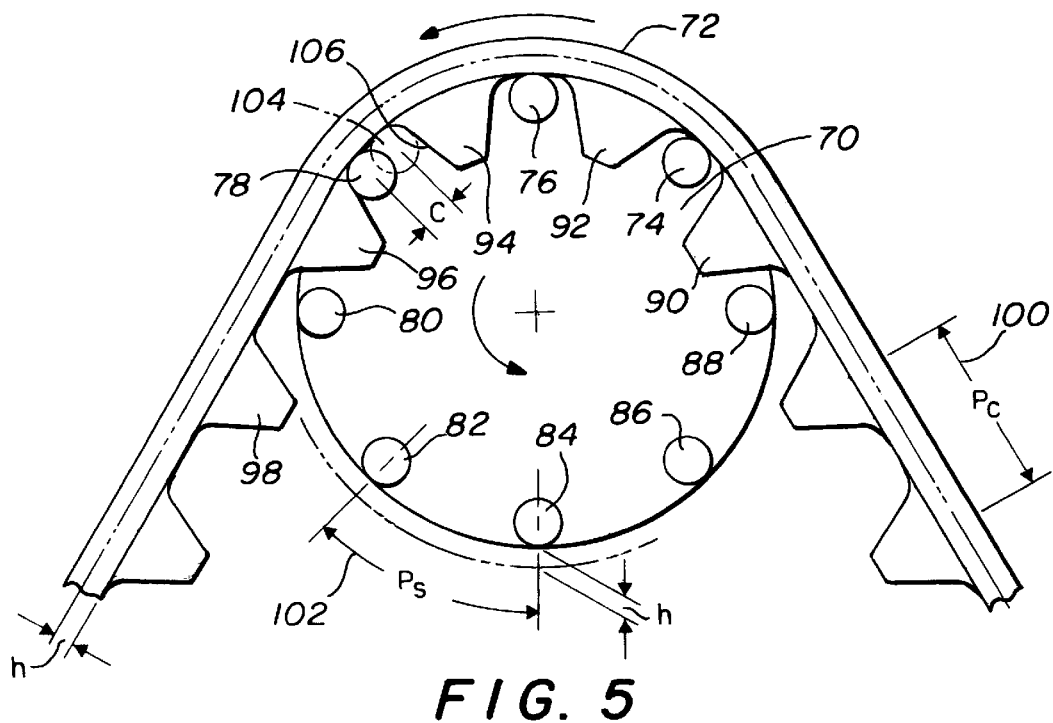
FIG. 5 is a schematic side view representation of a sprocket wheel illustrating the pins thereon engaging the endless rubber track.

FIG. 5 is a side view of a drive or sprocket wheel 70 over which rubber track 72 is shown partially engaging drive or sprocket wheel 70. Note that sprocket wheel 70 has sprocket pins 74, 76, 78, 80, 82, 84, 86, and 88 thereon with sprocket pins 74, 76 and 78, being in simultaneous contact with rubber drive track 72. Rubber drive track 72 has guide lugs 90, 92, 94, 96, and 98 shown extending inwardly therefrom. The arrow 100 illustrates the distance between adjacent guide lugs and represents the track pitch, Pc. The arrow designated by the numeral 102 represents the sprocket pitch, Ps, or the distance between adjacent sprocket pins. It has been found in tests that if the friction between the sprocket pins and the rubber track is significant, the sprocket pin cannot travel in the area C designated by the numeral 104 but the pin will abrade the brake side wall 106 of the guide lug 94, for instance. It was found that different sprocket or drive wheels require different up-ratios because of the actual number of pins in engagement with the rubber drive belt. From equation $$Pc \times Ur \times Nd \leq C \quad (6)$$

where: Nd=number of engaging pins, it can be seen that the smaller the number of sprocket pins in engagement with the rubber drive track 72, the bigger the up-ratio required. For instance in a test, the sprocket or drive wheel 70 that was used had 18 sprocket pins with nine of the sprocket pins in engagement with the endless rubber track. In a 500 km field test, the payload was 3500 kg in a logging area. An up-ratio of 1.53% was determined to be the best with no gouging of the rubber drive track guide lugs being observed. In a second test using a triangular shaped undercarriage with the drive or sprocket wheel at the top and with the sprocket or drive wheel having 15 pins but only four pins in engagement with the rubber drive track, it was found that an up-ratio of between three or four percent was the best. If the up-ratio is improper, gouging of the guide lugs occurs. Clearly, in accordance with equation (1) the key factors such as sprocket or drive wheel diameter, spacing or pitch of the sprocket pins, pitch of the guide lugs, and the winding thickness, h, shown in FIG. 4 must be controlled in the manufacturing process.

FIGS. 6A, B, and C demonstrate why a correct up-ratio is necessary for a positive drive endless rubber track system. FIGS. 6A, B, and C show various engagements between a sprocket pin and the driving guide lugs. When a sprocket pin engages a guide lug, there should be some deflection of the rubber on the driving side of the guide lug. This is a basic reason why the sprocket or drive wheel needs an up-ratio. If the sprocket or drive wheel has no up-ratio or has a negative up-ratio, the engaging pin first contacts the lower portion of the driving side wall of the guide lug and then gradually moves to the driving side wall. This is shown in FIG. 6A in which the sprocket pin 108 is shown entering the space between guide lugs 113 and 119 and engaging the driving wall 112 of guide lug 113 at position 110. It then moves the distance C designated by the numeral 114 and during that movement a braking force and heat are generated. It then engages the braking wall 118 of guide lug 119 as shown at position 116 and then exits as shown at position 120. Thus, in this case, the up-ratio is too small and is not acceptable because a braking force and heat are generated and gouging of each guide lug occurs.

FIG. 6B illustrates the operation of the system with a proper up-ratio of the sprocket or drive wheel. As can be seen in FIG. 6B, the sprocket pin 122 enters the space between guide lugs 128 and 130 and moves to position 124 at the bottom center 126 between the guide lugs 128 and 130 without contacting the braking wall 132. It then moves to the driving side wall 134 of guide lug 130 at position 136. It applies driving force to the driving wall 134 of the guide lug 130 and then exits at the position 138. With this acceptable up-ratio, minimum heat is generated and minimum friction exists at the bottom 126 of the space between drive lugs on the drive belt. No gouging of the driving wall 134 of guide lug 130 occurs.

FIG. 6C illustrates the operation of the system with a slightly large up-ratio. The sprocket pin enters the space between guide lugs 146 and 152 at position 140 and travels to position 142 that is very close to the braking wall 144 of guide lug 146. The sprocket pin then travels the distance, c, indicated by the numeral 148 to come to rest against the driving side 150 of guide lug 152 at position 154. It applies force to the guide lug 152 and then exits at position 156. Such operation is acceptable but has slightly more wear than the arrangement in FIG. 6B. Thus, it has been found that friction elements are not compatible with a positive drive endless rubber track system. For a positive drive to be successful, the friction elements need to be eliminated or minimized. This means that lower track tension must be provided and it is recommended that a smooth surface be used on the sprocket or drive wheels such as shown in FIGS. 3A and 3B herein.

The up-ratio of the sprocket is important for a positive drive system. The best up-ratio should be determined by the number of pins engaged with the track and the geometric freedom of the pin as shown in FIGS. 6B and C. For a half-track undercarriage in which nine pins of an 18 pin sprocket wheel engaged the track, an up-ratio of 1.0% to 1.5% was found to be the best. In the case of a triangular undercarriage, with four pins of a 15-pin sprocket wheel engaged with the track, a three to four percent up-ratio was found to be the best. With the proper up-ratio, it was found that a positive drive system provided firm power transmission without excessive tension in the track. It was also found that the damaging effects of engagement heat occurred by reason of friction between the guide lugs and the sprocket pins whenever the up-ratio was incorrect. If the up-ratio is correct, then the engagement between the guide lugs and the sprocket pins generates a minimum of heat and thus minimum damage is caused to the rubber track such that the positive drive system is acceptable. The wrong engagement, caused by an improper up-ratio, combined with high speed causes dangerous levels of heat.

Figure 7:
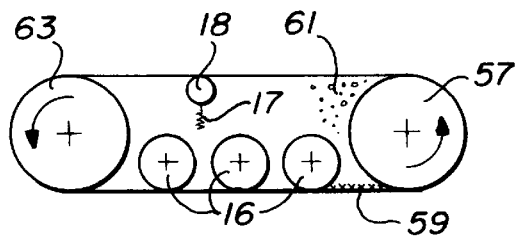
FIG. 7 illustrates a crawler tracker assembly of the present invention with a rear drive sprocket showing the accumulation of mud, dirt, and debris around the drive sprocket.

FIG. 7 is a generalized representation of a crawler-type track drive system of the present invention having idler wheels 16 and a belt tension wheel 18 adjusted by a device 17 that may be a spring, the drive system utilizing a front wheel 63 and a rear drive sprocket 57. Mud, dirt, and debris get between the drive sprocket 57 and drive belt 59 and create driving problems. Further, such debris goes to the top of drive sprocket 57 and falls off at 61 to create further problems.

Figure 8:
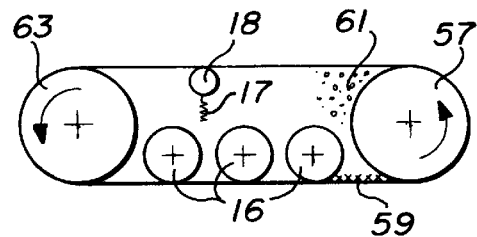
FIG. 8 illustrates a crawler track assembly of the present invention with a front drive sprocket showing how the accumulation of mud, dirt, and debris avoids the drive sprocket.

FIG. 8 is a generalized representation of a crawler-type track drive system of the type shown in FIG. 7 but in which front drive sprocket 63 provides the motive power. As can be seen, the problems with the debris at drive belt 59 are minimized because the debris accumulates at the rear wheel 57 and drops at 61 to the rear wheel. Friction losses are minimized and belt contact with drive sprocket 63 is maximized.

Figure 9:
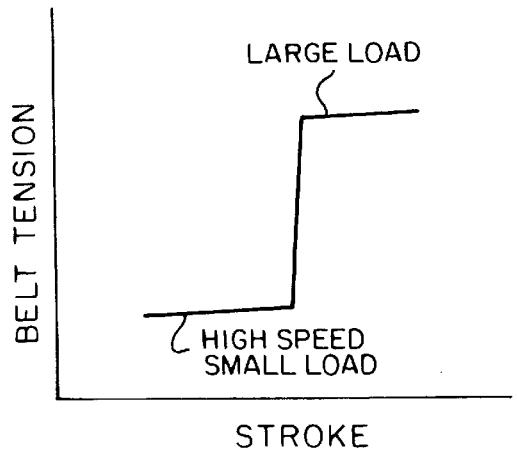
FIG. 9 is a graph illustrating how desired track tension is greater for a large load and low speed and is less for a smaller load at high speed.

FIG. 9 illustrates that with a high speed and small or no load, a first belt tension is required to minimize friction losses between the belt and the drive sprocket. Driving on the road from one location to another would approximate this condition. However, when being used in the field, as for instance on a farm, a relatively large load is handled at low speeds. In such instance, an increased belt tension is required to minimize friction. This can be accomplished with idler wheels being controlled by mechanical springs or operator controlled hydraulic cylinders in a well-known fashion.

Figure 10:
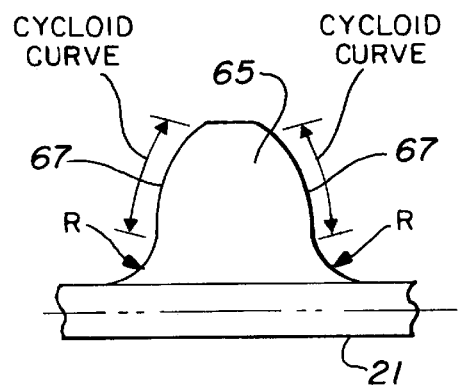
FIG. 10 illustrates a drive lug whose driving surface and braking surface has the shape of a cycloid.

FIG. 10 illustrates a novel cycloidal belt drive lug 65 having a cycloidal surface 67 on both the driving surface and the braking surface to allow the drive pins to follow their cycloidal path as described previously. The radius, R, of the junction of the drive lug 65 and drive belt 21 (FIG. 1) is the same radius as the drive pins 108, 122, and 140 shown in FIGS. 6A, 6B, and 6C. Again, this construction allows the drive pins to follow their normal cycloidal path with minimum engagement friction with the drive lugs 65.

Figure 11:
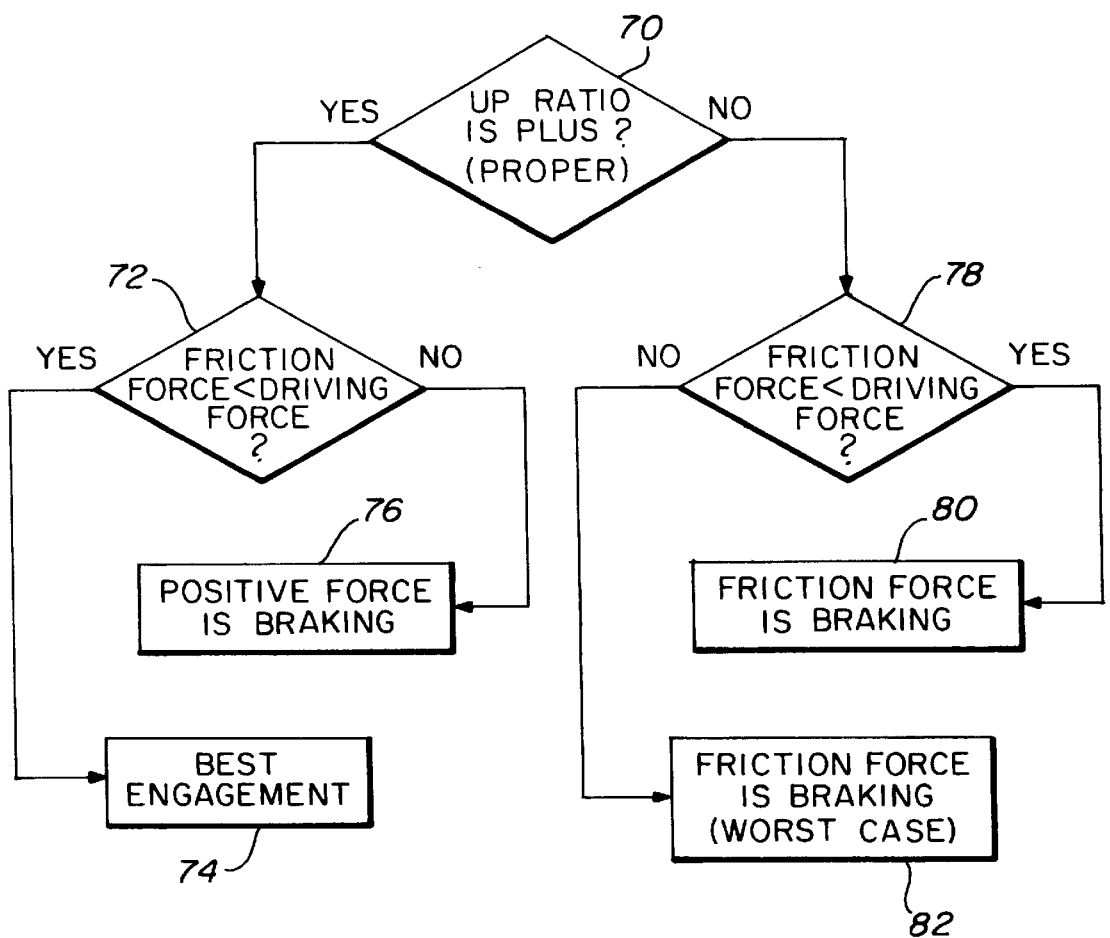
FIG. 11 is a flow chart illustrating the conditions under which various engagements of the drive pin and guide lugs are achieved.

FIG. 11 is a flow chart illustrating how various engagement of the drive pins and guide lugs are obtained. If the up-ratio is plus at step 70, then at step 72 it is determined if the friction force is less than the driving force. If so, the best engagement is indicated at 74. If the friction force is not less than the driving force, the positive force is providing the braking as indicated at 76.

If the up-ratio is not plus, or is not proper at decision step 70, then at step 78 it is again determined if the friction force is less than the driving force. If so, the friction force is braking as shown at 80. If the friction force is determined to be greater than the driving force at step 78, then the worst case friction braking force is obtained as indicated at 82.

Thus, there has been disclosed a novel positive drive endless rubber track system in which, if the proper up-ratio for the sprocket wheel is determined, the system will operate at high speeds with proper drive forces applied to the rubber track by the sprocket pins without the generation of unacceptable heat and gouging.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A positive drive endless rubber track system for an undercarriage of a vehicle including an endless rubber track having an inner surface with spaced guide lugs projecting inwardly therefrom and having a steel cord reinforcement integrally formed on the interior thereof, the undercarriage including a drive wheel, having spaced sprocket pins thereon for engaging said spaced guide lugs, idler wheels, and tension adjusting wheels around which the endless rubber track is guided and driven by said drive wheel, the system including:

said drive wheel being attached to said vehicle;

said drive wheel having an up-ratio, $Ur=[(Ps/Pc)-1] \times 100$ (%) in the range of about 0.5% to about 4.0% and where Ps=said spacing of said sprocket pins on said drive wheel, and Pc=said spacing of said guide lugs on said rubber track;

said spaced guide lugs having a driving wall and an opposite braking wall; and said up-ratio, Ur, enabling an engaging sprocket pin to enter between adjacent guide lugs without contacting either the driving wall or the braking wall of the adjacent guide lugs, to subsequently move toward and engage the driving wall of one of said adjacent guide lugs to drive the one adjacent guide lug, and to disengage the one adjacent guide lug as the drive wheel rotates.

2. A positive drive endless rubber track system as in claim 1 wherein:

the rubber track has a winding thickness, h, between the track inner surface and the steel cord reinforcement on the interior of said track; and said drive wheel having a practical up-ratio, $U_r$, in the range of about 0.5% to about 4.0% that accounts for the rubber track winding thickness, h, and calculated as $U_r=[(ASPd/CSPd)-1] \times 100 (\%)$ where $CSPd=(Pc \times Pn/\pi)-2h$ and where ASPd=actual sprocket or drive wheel diameter;

CSPd=calculated sprocket or drive wheel diameter taking into account winding thickness, h;

Pn=the number of sprocket pins; and h=the winding thickness of the rubber track between the track inner surface and the steel cord reinforcement on the interior of said track.

3. A positive drive endless rubber track system as in claim 1 wherein said drive wheel includes:

first and second spaced angular rings, each ring having a smooth outer circumference, a smooth inner circumference, and a width; and a plurality of spaced, elongated cylindrical sprocket pins attached between and having an outside diameter coterminous with the smooth outer circumference of said spaced angular rings with their elongated axes perpendicular to the direction of rotation of said drive wheel such that the rubber track guide lugs may enter said space between said angular rings to allow said sprocket pins to engage said guide lugs.

4. A positive drive endless rubber track system as in claim 1 wherein said drive wheel further includes:

an annular ring having a smooth outer circumference; and a plurality of equally spaced substantially cylindrical drive pins attached to said outer circumference and extending beyond each side of said annular ring for engaging corresponding guide lugs on said track.

5. A positive drive endless rubber track system as in claim 4 further including:

said drive pins having a first diameter portion attached to said outer circumference of said annular ring and a second smaller diameter portion extending beyond each of said annular ring;

a rotatable sleeve surrounding said second smaller diameter portion of each of said drive pins extending beyond each side of said annular ring;

each of said rotatable sleeves having an outer diameter substantially equal to the first diameter of said drive pins; and securing means attached to said drive pins to hold said rotatable sleeves on said drive pins.

6. A positive drive endless rubber track system as in claim 3 wherein each of said sprocket pins further includes:

a rotatable cylindrical sleeve thereon between said spaced annular rings; and said rotatable sleeve having said outside diameter coterminous with the smooth outer surface of said spaced annular rings to reduce friction contact between said rubber track and said drive pins.

7. A positive drive endless rubber track system as in claim 3 further including:

an annular recess in each of said first and second spaced annular rings; and an annular slip ring in each said annular recess coterminous with the smooth outer circumference of said spaced annular rings to reduce friction contact between said rubber track and said drive sprocket.

8. A positive drive endless rubber track as in claim 1 further including an adjustable track tension system to provide a first tension for relative high speed movement of the endless track at reduced loads and to increase the tension to a second greater tension for reduced speeds and increased loads.

9. A positive drive endless rubber track as in claim 1 further including a crawler-type track drive system having a front and a rear wheel, one of which is a drive wheel, the spaced wheels being separated by idler wheels and tension adjusting wheels.

10. A positive drive endless rubber track as in claim 9 wherein said drive wheel is the front wheel.

11. A positive drive endless rubber track system for an undercarriage of a vehicle, the undercarriage including a drive wheel, idler wheels, and tension wheels around which an endless rubber track is guided, the system including:

said drive wheel being attached to the vehicle and having sprocket pins around a circumference thereof that are spaced from each other a distance, Ps;

regularly spaced guide lugs protruding inwardly from said rubber track and being spaced from each other a distance, Pc;

each guide lug having a driving wall and a braking wall;

said rubber track engaging said drive wheel such that, during rotation of said drive wheel, each of said drive wheel sprocket pins successively enters between adjacent ones of said rubber track guide lugs to engage the driving wall of one of said guide lugs to drive said rubber track; and said drive wheel having an up-ratio of $[(Ps/Pc)-1]\times 100$ (%) such that an engaging sprocket pin enters between adjacent guide lugs without contacting either the driving wall or the braking wall then subsequently moves toward and engages said driving wall to drive said guide lug and then disengages as said drive wheel rotates.

12. A positive drive endless rubber track system as in claim 11 wherein said up-ratio is in the range of about 0.5% to about 4.0%.

13. A positive drive endless rubber track system as in claim 11 wherein said drive wheel includes:

first and second spaced annular rings, each ring having a smooth outer surface circumference and a surface width; and a plurality of said sprocket pins attached between and having an outside diameter coterminous with the smooth outer circumference of said spaced annular rings with their elongated axes perpendicular to the direction of rotation of said drive wheel such that the rubber track guide lugs may enter said spaces between said annular rings to allow said sprocket pins to engage said drive lugs.

14. A positive drive endless rubber track system as in claim 11 wherein said drive wheel further includes:

an annular ring having a smooth outer surface circumference; and a plurality of said equally spaced substantially cylindrical sprocket pins attached to said outer surface circumference and extending beyond each side of said annular ring for engaging corresponding guide lugs on said track.

15. A positive drive endless rubber track system as in claim 14 further including:

said sprocket pins having a first diameter portion attached to said outer surface of said annular ring and a second smaller diameter portion extending beyond each side of said annular ring;

a rotatable sleeve mounted on and surrounding said second smaller diameter portion of each of said sprocket pins extending beyond each side of said annular ring to reduce friction between said sprocket pins and said rubber track;

each of said rotatable sleeves having an outer diameter substantially equal to the first diameter of said sprocket pins; and securing means attached to said sprocket pins to hold said rotatable sleeves on said sprocket pins.

16. A positive drive endless rubber track system as in claim 13 wherein each of said sprocket pins further includes:

a rotatable cylindrical sleeve thereon between said spaced annular rings; and said rotatable sleeve having said outside diameter coterminous with the smooth outer surface of said spaced annular rings to reduce friction contact between said rubber track and said sprocket pins.

17. A positive drive endless rubber track system as in claim 14 wherein each of said sprocket pins is elongated and cylindrical in shape and is attached in said spaced relationship to the smooth outer surface circumference of said annular ring with its elongated axis perpendicular to the direction of rotation of said drive wheel such that a rubber track guide lug may enter said space between said annular ring to allow said sprocket pins to engage in said guide lugs.

18. A positive drive endless rubber track system as in claim 13 further including:
   an annular recess in each of said first and second spaced annular rings; and
   an annular slip ring in each said annular recess coterminous with the smooth outer circumference of said spaced annular rings to reduce friction contact between said rubber track and said drive sprocket.

19. A positive drive endless rubber track system as in claim 11 wherein:
   the rubber track has a winding thickness, h; and
   a practical up-ratio to account for winding thickness, h, is calculated as $[(ASPd/CSPd)-1] \times 100(\%)$ where $CSPd = [(Pc \times Pn)/\pi] - 2h$, and where ASPd=actual sprocket outside wheel diameter, CSPd=calculated sprocket wheel diameter, Pc=spacing distance of guide lugs, Pn=number of sprocket pins, and h=winding thickness of the rubber track.

20. A positive drive endless rubber track system as in claim 19 including:
   said drive wheel having an increased diameter ASPd and the same sprocket pin spacing thereby increasing the number of sprocket pins in engagement with said guide lugs on said track and decreasing said up-ratio required.

21. A method of operating a positive drive endless rubber track system for an undercarriage of a vehicle including an endless rubber track having an inner surface with spaced guide lugs projecting inwardly therefrom and having a steel cord reinforcement integrally formed on the interior thereof, the undercarriage including a drive wheel, having spaced sprocket pins thereon for engaging said spaced guide lugs, idler wheels, and tension adjusting wheels around which the endless rubber track is guided and driven by said drive wheel, the method providing the correct engagement of the sprocket pins with the guide lugs and comprising the steps of:
   attaching the drive wheel to said vehicle;
   spacing the sprocket pins on the drive wheel and the guide lugs on the rubber track such that the drive wheel has an up-ratio, $Ur=[Ps/Pc-1] \times 100(\%)$ in the range of about 0.5% to about 4.0% where Ps equals the spacing of the sprocket pins on the drive wheel and Pc equals the spacing of the guide lugs on the rubber track;
   forming a driving wall and an opposite braking wall on each of said spaced guide lugs; and
   enabling an engaging sprocket pin to enter between adjacent guide lugs without contacting either the driving wall or the braking wall of the adjacent guide lugs, to subsequently move toward and engage the driving wall of one of said adjacent guide lugs to drive the one adjacent guide lug, and to disengage the adjacent guide lug as the drive wheel rotates because of said up-ratio, Ur.

22. A method as in claim 21 further including the steps of:
   providing a winding thickness, h, on the endless rubber track between the track inner surface and the steel cord reinforcement on the interior of said track; and
   accounting for the rubber track winding thickness, h, by providing said drive wheel with a practical up-ratio, $U_r$, in the range of about 0.5% to about 4.0% and calculated as
   $U_r=[(ASPd/CSPd)-1] \times 100(\%)$ where
   $CSPd=(Pc \times Pn/\pi)-2h$ and where
   ASPd=actual sprocket or drive wheel diameter;
   CSPd=calculated sprocket or drive wheel diameter taking into account winding thickness, h;
   Pn=the number of sprocket pins; and
   h=the winding thickness of the rubber track between the track inner surface and the steel cord reinforcement on the interior of said track.

* * * * *

UNITED STATES PATENT AND TRADEMARK OFFICE
CERTIFICATE OF CORRECTION

PATENT NO. : 6,139,121
DATED : October 31, 2000
INVENTOR(S) : Muramatsu

It is certified that error appears in the above-identified patent and that said Letters Patent is hereby corrected as shown below:

<u>Title page,</u>
Insert item [*] Notice:   Under 35 U.S.C. 154(b), the term of this patent shall be extended for 475 days. --.

Signed and Sealed this

Eighteenth Day of March, 2003

JAMES E. ROGAN
*Director of the United States Patent and Trademark Office*